(12) United States Patent
Heren

(10) Patent No.: US 9,726,244 B2
(45) Date of Patent: Aug. 8, 2017

(54) BRAKING SYSTEM EQUIPPED WITH COOLING MEANS

(71) Applicant: Poclain Hydraulics Industrie, Verberie (FR)

(72) Inventor: Jean Andre Heren, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 36 days.

(21) Appl. No.: 14/716,824

(22) Filed: May 19, 2015

(65) Prior Publication Data

US 2015/0330468 A1    Nov. 19, 2015

(30) Foreign Application Priority Data

May 19, 2014 (FR) ...................................... 14 54448

(51) Int. Cl.
  *B60T 13/68* (2006.01)
  *F16D 65/853* (2006.01)
  (Continued)

(52) U.S. Cl.
  CPC ............. *F16D 65/853* (2013.01); *B60T 5/00* (2013.01); *B60T 15/36* (2013.01); *F16D 65/78* (2013.01); *F16D 2065/782* (2013.01)

(58) Field of Classification Search
  CPC ................................ F16D 65/853; B60T 15/36
  (Continued)

(56) References Cited

U.S. PATENT DOCUMENTS

| 2,976,965 A | * | 3/1961 | Schjolin | ................ B60T 13/141 188/264 D |
| 3,358,442 A | * | 12/1967 | Cryder | .................. B60T 13/148 60/427 |

(Continued)

FOREIGN PATENT DOCUMENTS

| EP | 1878935 | 1/2008 |
| FR | 2140211 | 1/1973 |
| WO | WO-2006066146 | 6/2006 |

OTHER PUBLICATIONS

French Search Report mailed Feb. 18, 2015, FR Appln. No. 1454488 (7 pages).

*Primary Examiner* — Christopher Schwartz
(74) *Attorney, Agent, or Firm* — Blakely Sokoloff Taylor & Zafman LLP

(57) ABSTRACT

The invention relates to a braking system (1) including:
  a dynamic brake (10), including a hydraulic ram (11), including a cylinder (12), a piston (13) movable in the cylinder (12), and a chamber (14) capable of being filled to displace the piston within the cylinder and actuate the brake,
  a circuit (20) for feeding the brake, including a reservoir (21) a pump (22) and a brake feed line (26),
a brake control device (30), including a fluid pressure regulating valve (32) in the brake chamber, and progressive control (31), the valve including a path connected to the feed line, a path connected to the reservoir, and a path connected to the brake chamber, and being designed to selectively connect the path connected to the chamber to one or the other of the other paths, to deliver a predetermined pressure into the chamber according to a degree of actuation of the control, (Continued)

the braking system being characterized in that it further includes a chamber cooling line (40), designed to renew the fluid contained in the chamber to ensure cooling of said chamber.

21 Claims, 8 Drawing Sheets

(51) Int. Cl.
*B60T 15/36* (2006.01)
*B60T 5/00* (2006.01)
*F16D 65/78* (2006.01)

(58) Field of Classification Search
USPC .................. 303/2, 9.65, 52, 57, 71, 83, 3, 7
See application file for complete search history.

(56) References Cited

U.S. PATENT DOCUMENTS

| | | | |
|---|---|---|---|
| 3,727,988 A | 4/1973 | Peruglia et al. | |
| 3,768,871 A * | 10/1973 | Meyers | B60T 13/22 180/426 |
| 3,836,205 A * | 9/1974 | Schwerin | B60T 8/326 188/3 R |
| 5,390,986 A * | 2/1995 | Hall, III | B60T 8/32 188/71.4 |
| 6,386,333 B1 | 5/2002 | Russell | |
| 8,240,779 B2 * | 8/2012 | Daigre | B60T 13/683 180/308 |
| 8,322,797 B2 * | 12/2012 | Mamei | B60T 13/148 303/2 |
| 2002/0153215 A1 * | 10/2002 | Kusano | B60T 13/145 188/355 |
| 2003/0178271 A1 * | 9/2003 | Nakano | B60T 17/04 188/355 |
| 2009/0127927 A1 * | 5/2009 | Heren | B60T 13/686 303/17 |
| 2010/0106385 A1 * | 4/2010 | Ramler | B60T 13/265 701/70 |

* cited by examiner

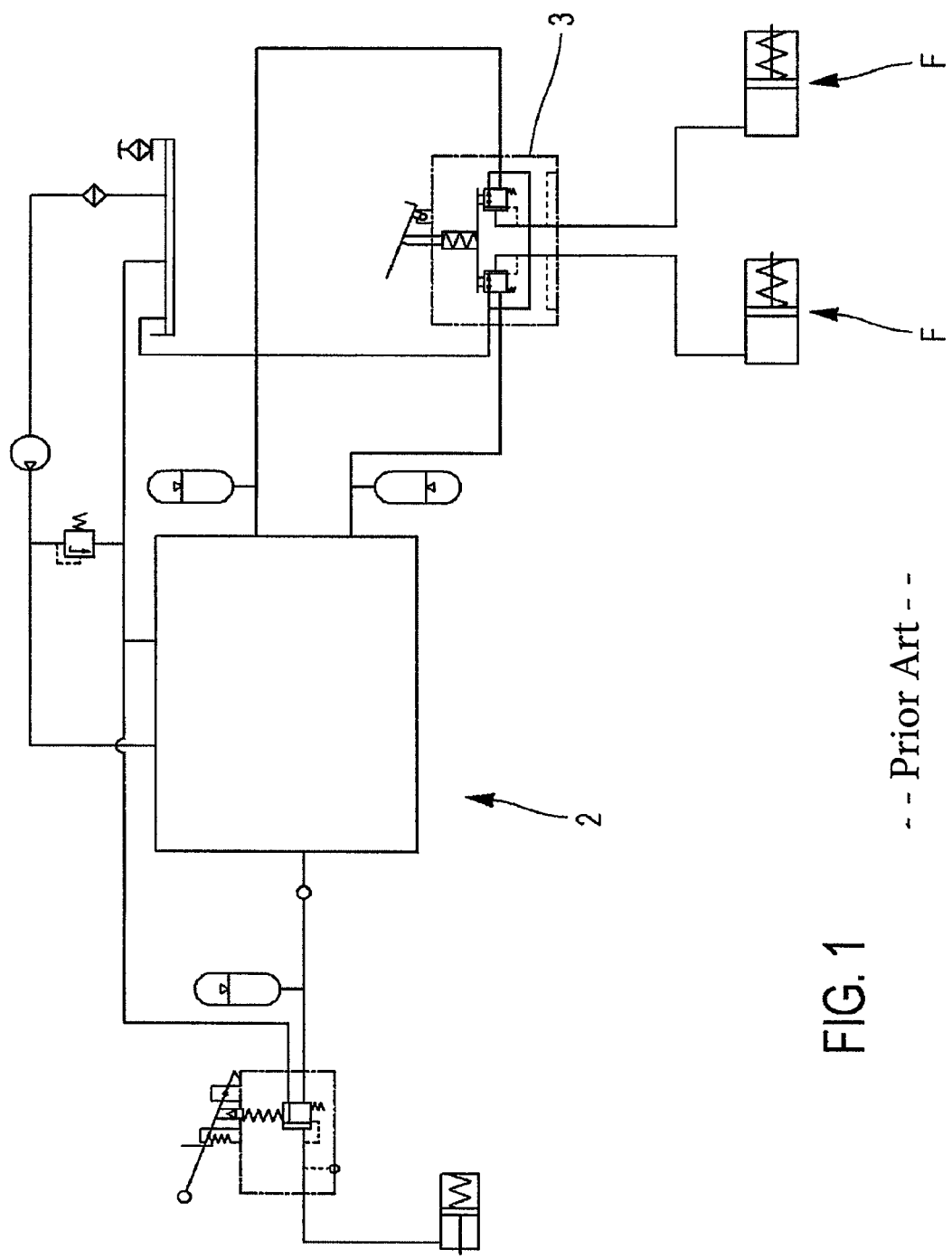
FIG. 1 -- Prior Art --

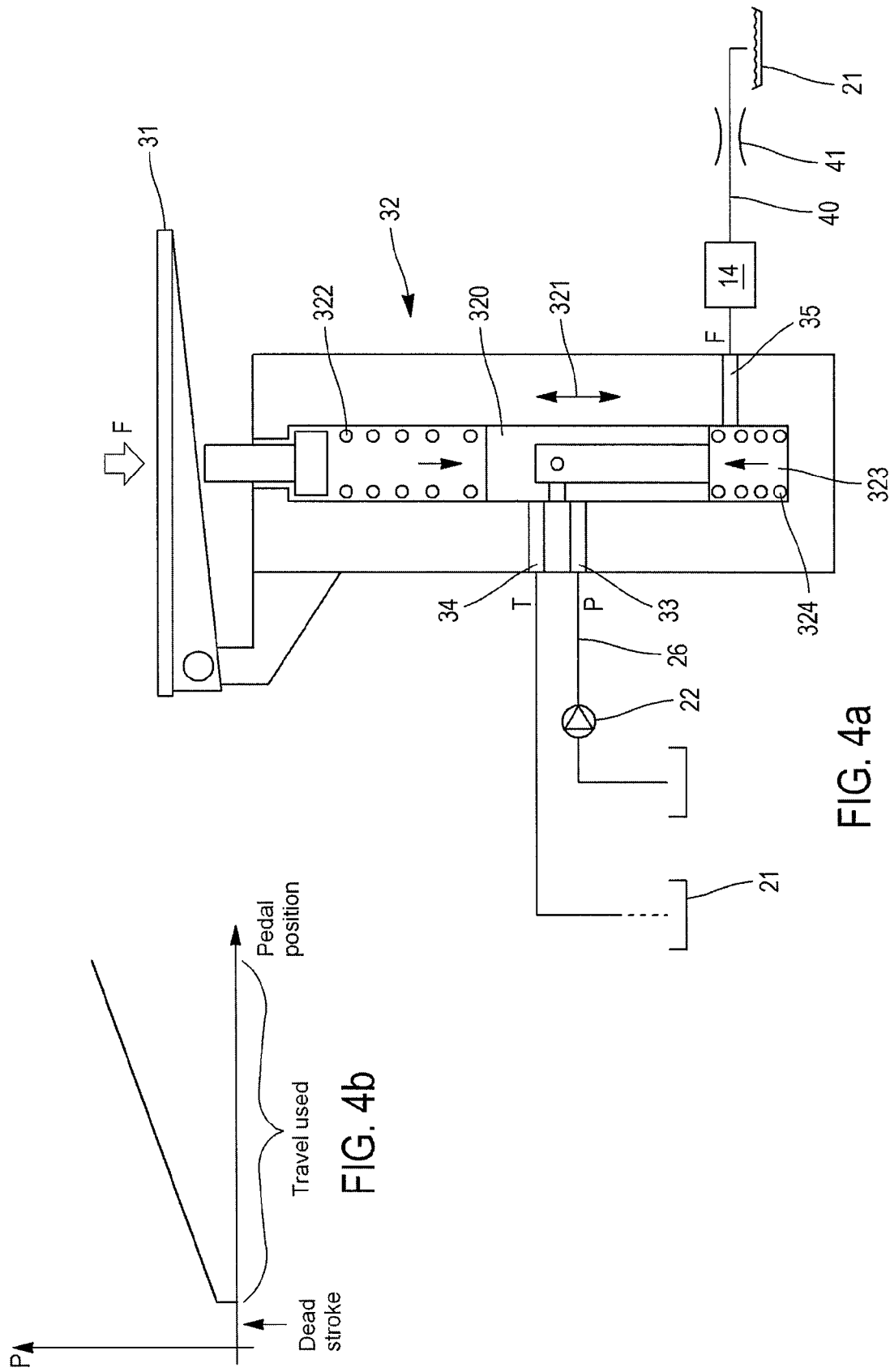

BRAKING SYSTEM EQUIPPED WITH COOLING MEANS

FIELD OF THE INVENTION

The invention relates to the field of vehicle braking systems, of vehicles equipped with such systems, and of cooling said systems.

PRIOR ART

With reference to FIG. 1, a hydraulic braking system for a vehicle is shown.

The braking system includes a hydraulic circuit to feed the brake, including a reservoir, a pump connected to the reservoir and designed to cause a flow of oil to circulate in the circuit, and a brake feed line.

The system also includes a dynamic brake F, typically of the disk brake type. This brake includes a disk fixed on the hub of a wheel, and brake pads which, when the brake is actuated, slow the rotation of the disk, and hence of the wheel, by friction against the disk.

The brake also includes a hydraulic ram, including a piston that is movable inside a cylinder, the displacement whereof drives that of the pads against the disk. Feeding the hydraulic brake causes filling of the chamber of the ram, causing displacement of the piston in the cylinder and actuation of the brake.

In order to regulate the intensity of braking, the braking system also includes a brake control device 3, typically with progressive mechanical control, which is actuated when the driver of the vehicle presses on the brake pedal.

The control device further includes a pressure regulating valve which makes it possible to fill the chamber with an oil pressure that is variable according to the degree of actuation of the control.

The pressure regulating valve includes an inlet/outlet port connected to the feed line, an inlet/outlet port connected to the reservoir, and an inlet/outlet port connected to the chamber of the ram.

A degree of actuation given to the pedal corresponds to a degree of braking desired. During this actuation, the regulating valve switches into a position wherein the feed line of the hydraulic circuit communicates with the ram chamber, until it fills said chamber to the desired pressure.

When the pressure in the chamber exceeds the desired level, or when the brake pedal is released, the regulating valve switches to connect the chamber of the ram to the reservoir, and thus to empty the chamber to release the brake.

During actuation of this brake, friction causes considerable heating of the brake, which can propagate up to the chamber of the ram, which brings about a risk of heating and evaporation of the oil contained in the chamber, which can considerably deteriorate the brake and reduce its lifetime.

There therefore exists a need to minimize heating in the chamber of the ram during use of the brake.

DESCRIPTION OF THE INVENTION

The invention has as its goal to propose a braking system including a brake of the disk brake type, the heating whereof is reduced.

To this end, the invention has as its object a braking system including:
 a dynamic brake, including a hydraulic ram, including a cylinder, a piston movable within the cylinder, and a chamber capable of being filled to displace the piston within the cylinder and actuate the brake,
 a feeding circuit for the brake, including a reservoir, a pump and a brake feed line,
 a brake control device, including a regulating valve for regulating fluid pressure in the brake chamber, and a progressive control, said device being designed to deliver a predetermined pressure into the chamber depending on a degree of actuation of the control,
 the braking system being characterized in that the fluid pressure regulating valve includes an inlet/outlet port connected to the feed line, an inlet/outlet port connected to the reservoir, and an inlet/outlet port connected to the brake chamber, the fluid pressure regulating valve being designed to selectively connect the inlet/outlet port connected to the chamber to one or the other of the other ports, depending on the pressure in the chamber and to the degree of actuation of the control,
 and in that it further includes a cooling line of the chamber, designed to renew the fluid contained in the chamber to provide for the cooling of said chamber.

Advantageously but optionally, the braking system according to the invention further includes at least one of the following characteristics:
 the pressure regulating valve is designed to deliver to the brake chamber a fluid pressure proportional to a degree of actuation of the control.
 the regulating valve includes:
  a plunger movable in translation within a cylinder,
  a pressure transfer member, designed to exert a pressure on the plunger tending to put the inlet/outlet port connected to the feed line into communication with the inlet/outlet port connected to the brake chamber in response to the actuation of the control, and
  a feedback chamber connected to the brake chamber by an inlet/outlet port of the valve, the chamber being positioned on the side of the transfer member opposite to the plunger so that a pressure of fluid in the chamber exerts a pressure on the plunger tending to put the inlet/outlet port connected to the brake chamber into communication with the inlet/outlet port connected to the reservoir.
 the pressure regulating valve is designed to connect the inlet/outlet port connected to the chamber to the inlet/outlet port connected to the reservoir when the pressure in the chamber exceeds a pressure corresponding to a level of actuation of the control.
 the brake cooling line includes a restriction designed to allow the circulation of a cooling flow rate greater than or equal to twice the volume of the chamber per minute, preferably greater than or equal to five times the volume of the chamber per minute.
 the braking system includes at least two dynamic brakes and the brake cooling line includes as many restrictions as brakes.
 the restrictions are arranged in parallel, between each brake chamber and a withdrawal end of the cooling line.
 the cooling line connects the brake chamber to a line at a pressure equal to or greater than the pressure of the reservoir.
 the brake cooling line is connected to the feed line, to withdraw from it or to inject into it the cooling stream of said line.
 the braking system is mounted inside a vehicle including a secondary hydraulic circuit, and the cooling line of the braking system is connected to said secondary circuit to withdraw from it or to inject into it the cooling stream.

the secondary circuit is a booster circuit for a transmission circuit.

The invention also has as its goal a vehicle, including a braking circuit according to the above presentation.

The invention also relates to a cooling method for a brake of a vehicle including such a braking system, the method including, when the brake is not actuated, feeding the brake chamber through the cooling line at a pressure lower than the brake actuation pressure, and discharging the chamber toward the reservoir through the pressure regulating valve of the control device.

Advantageously, but optionally, the cooling method can also include at least one of the following features:

the method is implemented in a vehicle equipped with a braking system wherein the cooling line of the brake is connected to the feed line, the system further including at least one hydraulic accumulator, and a module designed to charge the accumulator or to achieve a vacuum of the pump, and the feed line for the brakes including a portion upstream of the module and a portion downstream of the module, the method further including:

when the brake is actuated, simultaneous feeding of the chamber by the feed line and the cooling line, and discharge of the chamber to the reservoir through the pressure regulating valve for regulating the pressure in the chamber, when the module charges the accumulator or achieves a vacuum of the pump and the pressure in the chamber is less than the pressure in the upstream portion of the feed line, or feeding the chamber through the downstream portion of the feed line and discharge of the chamber toward the upstream portion of the feed line through the restriction when the module achieves a vacuum of the pump and the pressure in the chamber is greater than the pressure in the upstream portion of the feed line.

The method is implemented in a vehicle provided with a braking system further including a secondary circuit, the method further including, when the brake is actuated, feeding the chamber through the feed line and discharge of the chamber toward the secondary circuit through the cooling line if the braking pressure in the chamber is greater than the pressure in the secondary circuit, or feeding the chamber through the secondary circuit and its discharge toward the reservoir through the pressure regulating valve if the pressure in the chamber is less than the pressure of the secondary circuit.

The braking system solves the problem posed by means of a renewal of fresh fluid in the chamber of the ram of the dynamic brake, thus making it possible to cool the chamber and to avoid heating of the fluid, whether the brake is actuated or not.

DESCRIPTION OF THE FIGURES

Other features, aims and advantages of the invention will be revealed by the description hereafter, which is purely illustrative and not limiting, and which must be read with reference to the appended drawings, wherein:

FIG. 1, already described, shows a prior art braking system.

FIG. 4a shows schematically a pressure regulating valve, and FIG. 4b shows the relation between the pressure in the brake chamber and the degree of actuation of the brake control allowed by this valve.

DETAILED DESCRIPTION OF AT LEAST ONE EMBODIMENT OF THE INVENTION

Figure 2A:
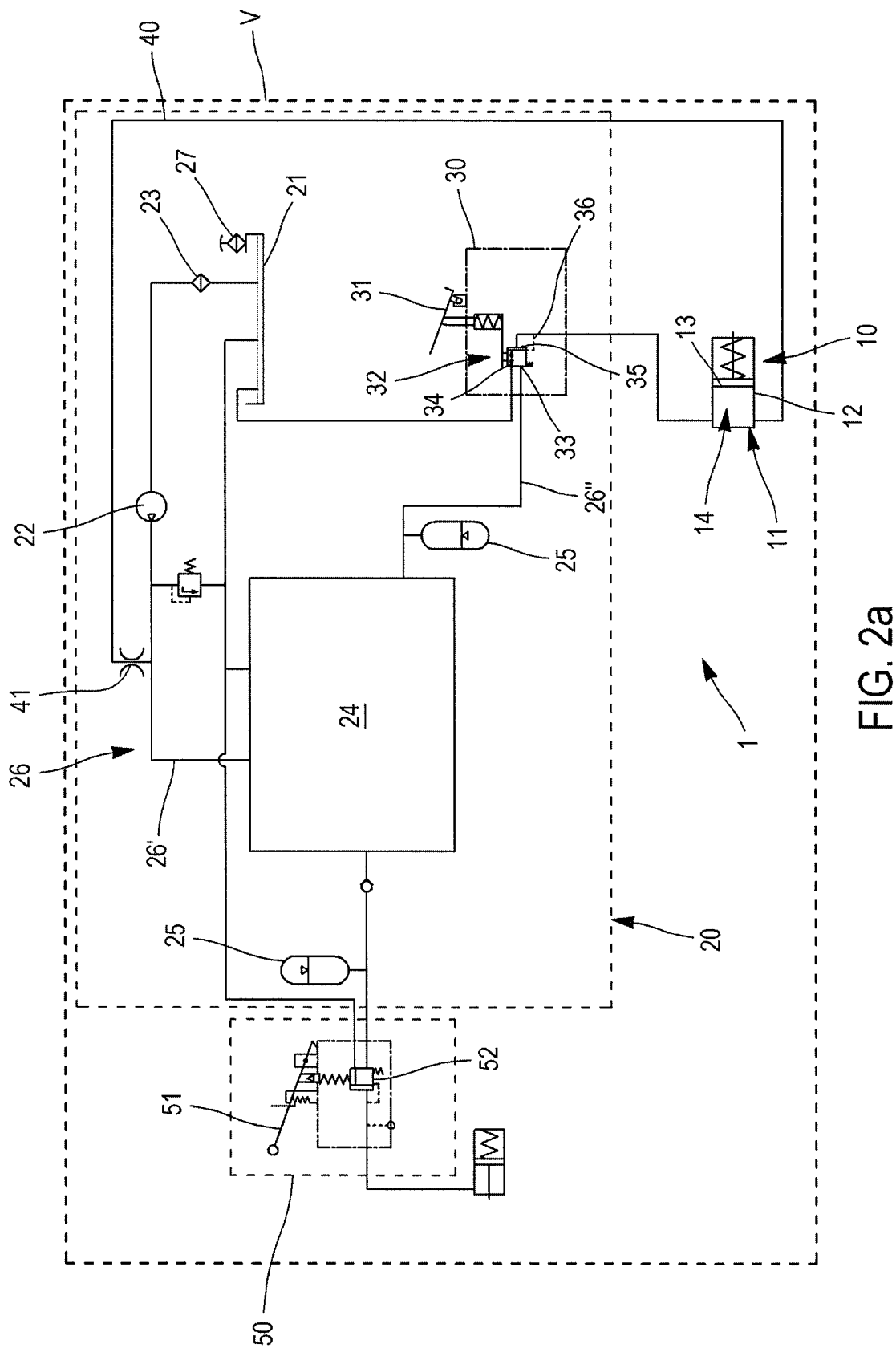
FIG. 2a shows an embodiment of a braking system according to the invention.

Referring to FIG. 2a, the braking system 1 of a vehicle V is shown, according to one embodiment of the invention.

Figure 2B:
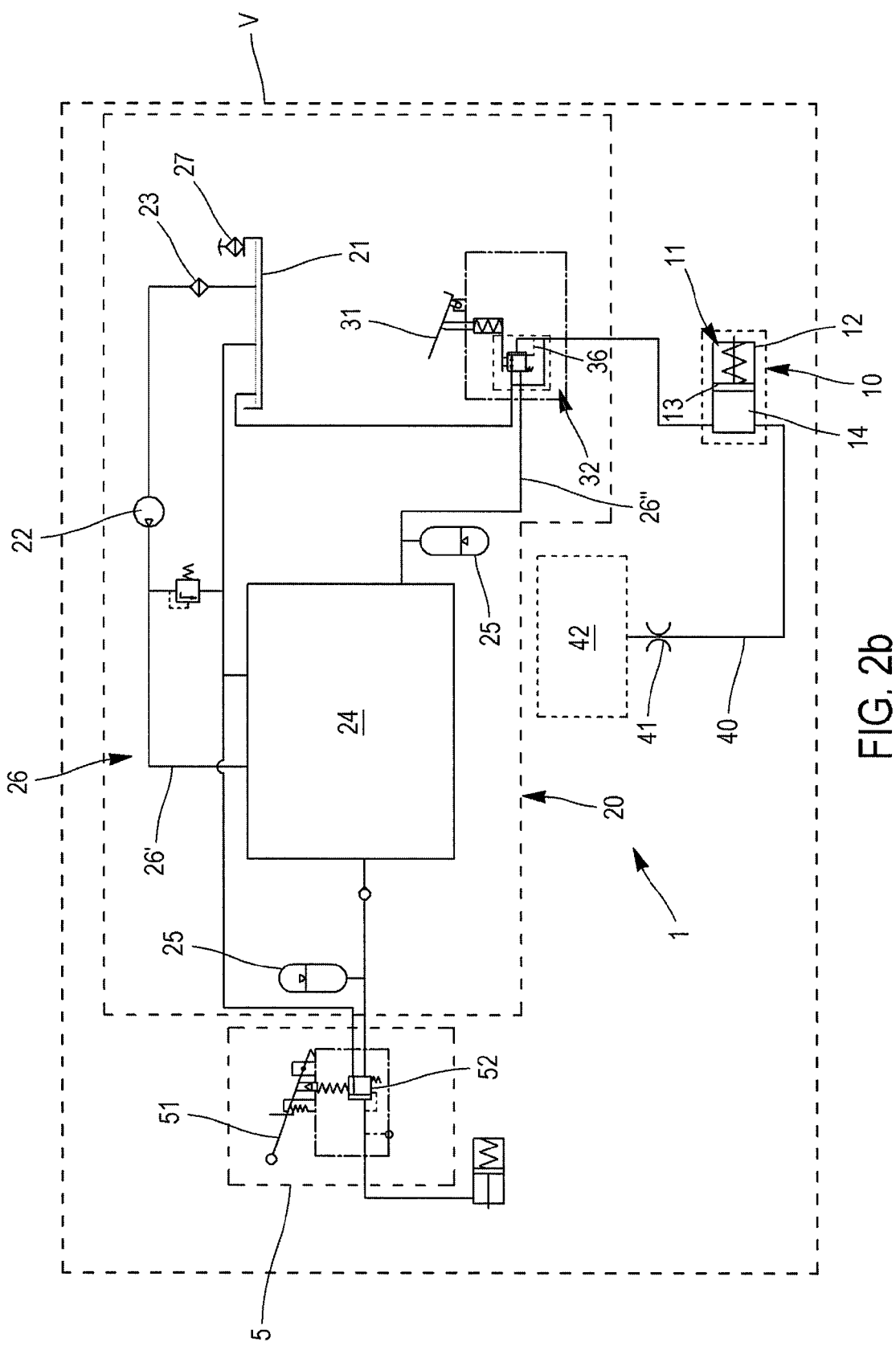
FIG. 2b shows an alternative embodiment of the braking system

This braking system 1 includes at least one dynamic brake 10, also called a service brake, used when the vehicle is moving. In FIGS. 2a and 2b, the braking system has a single dynamic brake.

As a variant, as illustrated in FIGS. 3a to 3d, the braking system 1 can include several dynamic brakes 10. These brakes can be actuated simultaneously and balanced or alternatively, as in the figures, be controlled independently. In this case, these brakes can be actuated for different pressure values, for example for operating the braking of two different axles such as a front axle and a rear axle of the vehicle. Depending on the number of axles of the vehicle, however, the braking system can include a larger number of brakes.

Each brake 10 can be of the disk or drum brake type, and includes to this end braking elements (disks or drums) and friction linings (not shown).

Each brake thus includes a hydraulic ram 11 including a cylinder 12 and a piston 13 movable within the cylinder. The portion of the cylinder which is left empty by the piston 13 is the chamber 14 of the ram 11. This chamber is fed under pressure to displace the piston in the cylinder and actuate the brake.

By way of a non-limiting example, we will consider below the case of a brake actuated progressively as soon as the pressure rises in the control chamber, with for example 50% of the braking strength at 50 bars and 100% at 100 bars.

In FIGS. 2a to 3d, the braking system 1 also includes a circuit 20 for feeding the brake. This circuit includes a reservoir 21 at atmospheric pressure, a pump 22, designed to take oil from the reservoir (21) and make it circulate in the circuit. According to the preceding example, the oil pressure leaving the pump is of the order of 200 to 210 bars. The pressure is thus strictly greater than the maximum actuation pressure of the brakes to ensure that actuation, and also to charge all the hydraulic accumulators 25 of the circuit, these accumulators then being able to restore maximum operating pressure of the brakes in case of failure in the hydraulic circuit.

In this regard, the circuit 20 also includes a module 24 allowing the accumulators to be charged, and to occasionally achieve a vacuum of the pump 22 when the accumulators are full.

Advantageously, the circuit 20 includes a filter 23 or strainer to filter the oil taken in by the pump 22, and a breather 27 in the reservoir 21.

Finally, the circuit includes a line 26 for feeding the brake 10, including an upstream portion 26' connecting the pump 22 to the module 24, and a downstream portion 26" leaving the module, allowing a hydraulic pressure to be delivered to the brakes 10.

Preferably but without limitation, the braking system 1 further includes a static brake 50, commonly called a handbrake or parking brake, and used when the vehicle is at rest. This static brake is also supplied by the feeding circuit 20 and has in this regard a pressure regulating valve 52 with a control lever 51, designed to connect the static brake to the reservoir 21 when the lever is pulled, which causes actuation of the brake, and to feed the brake when the lever is released, causing release of the brake.

Advantageously but optionally, the pressure regulating valve 52 can have a structure and operation conforming to those of the pressure regulating valve 32 described hereafter with reference to FIG. 4a.

The braking system also includes a brake control device 30, including a progressive control 31, preferably mechanical, such as for example a brake pedal, the control device 30 being designed to progressively actuate the brakes 10 in response to a degree of actuation of the control 31.

In this regard, the control device 30 also has one pressure regulating valve 32 per brake 10.

In FIGS. 2a and 2b, a single valve 32 has thus been shown for the brake 10.

Figure 3A:
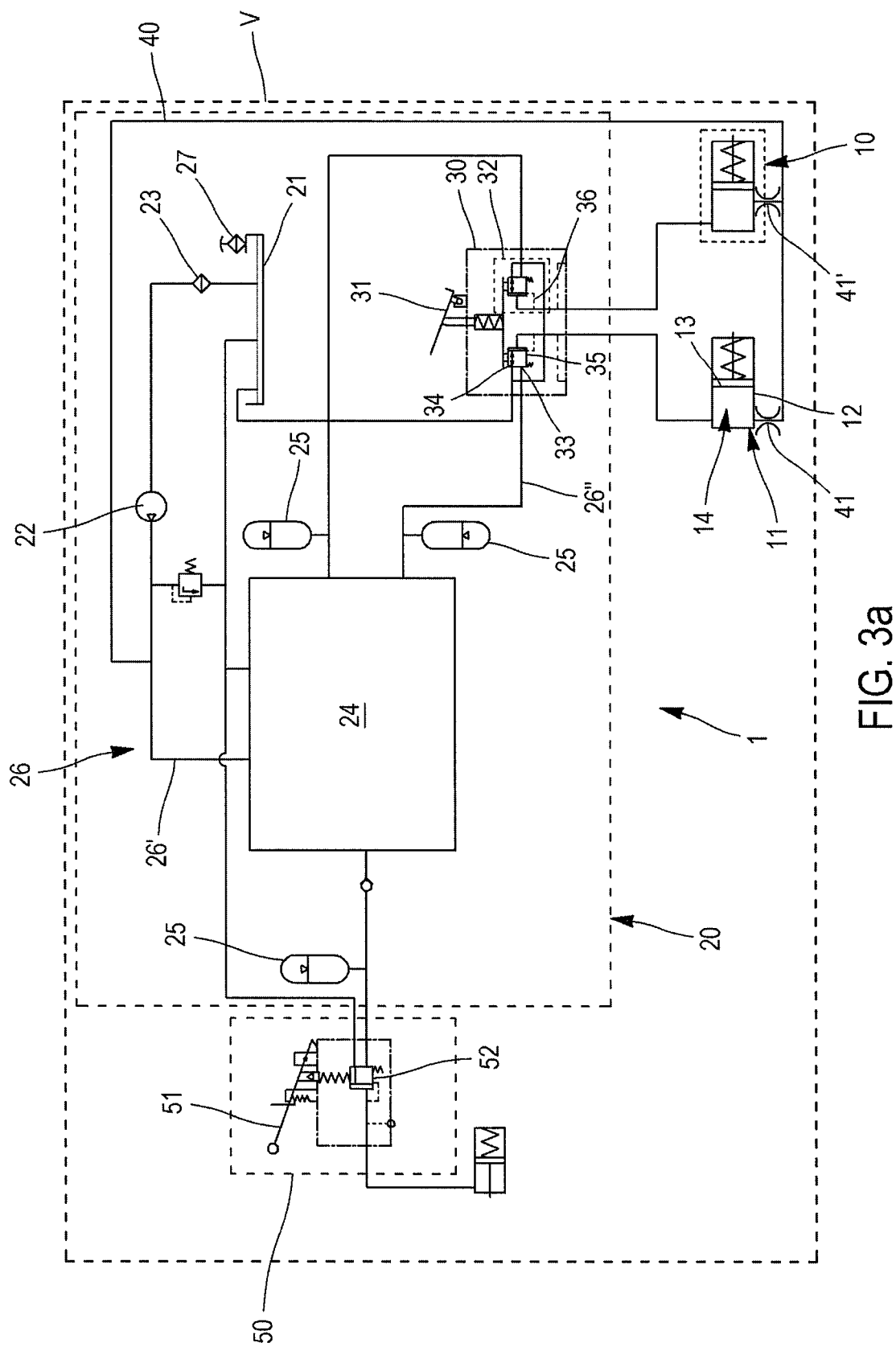
FIGS. 3a and 3b show a variant of the embodiments of FIGS. 2a and 2b respectively.
Figure 3B:
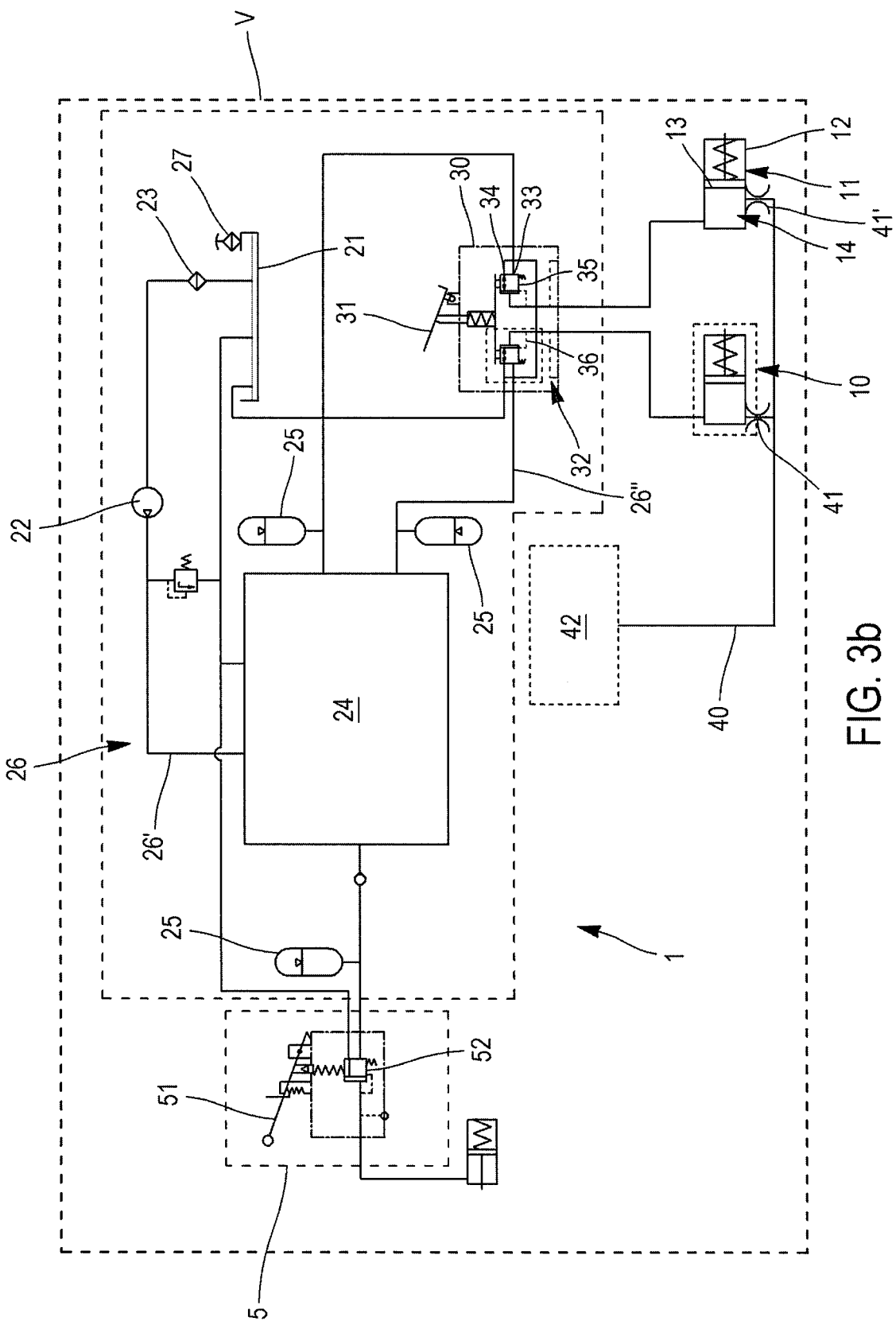
Figure 3C:
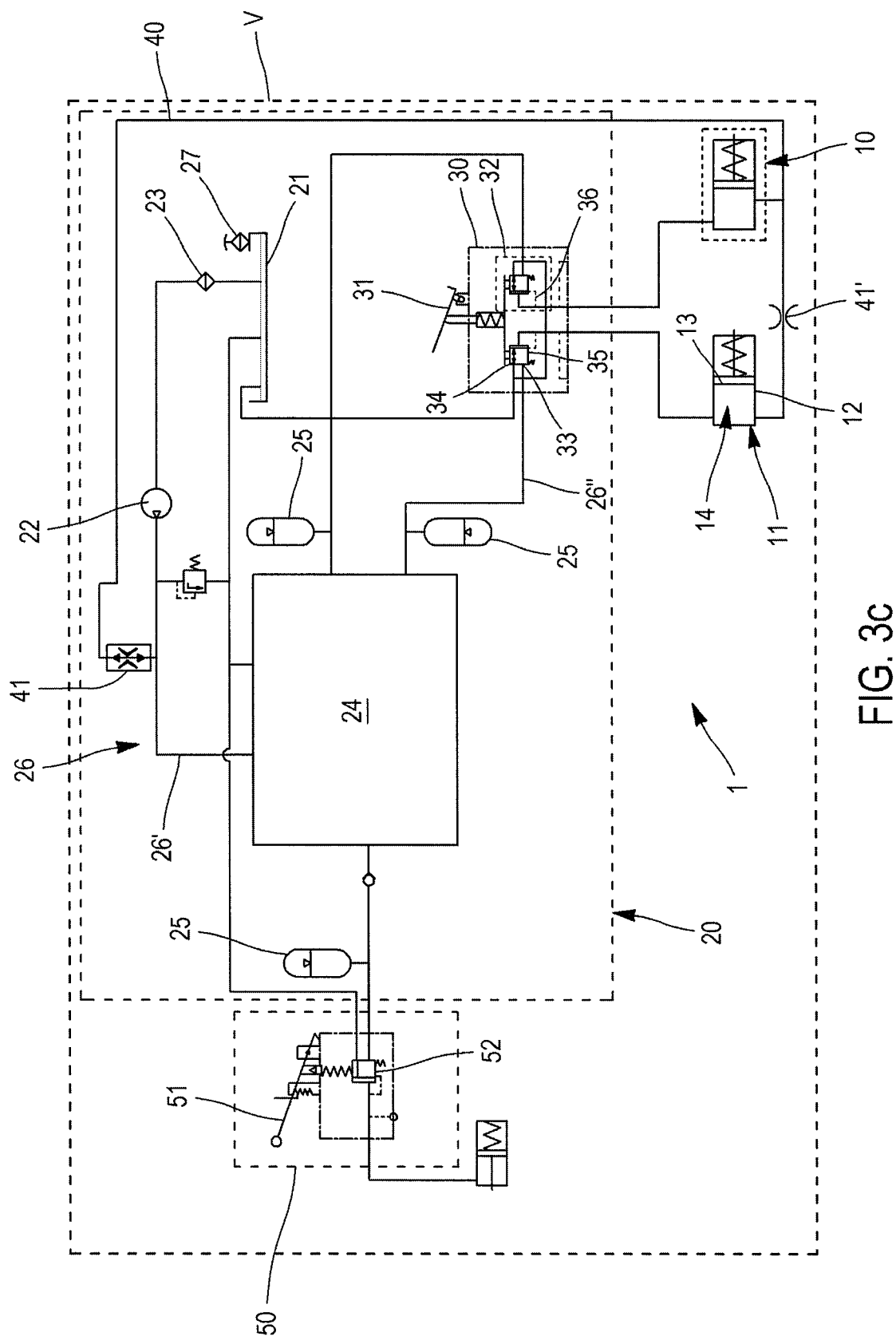
FIGS. 3c and 3d show another variant of the embodiments of FIGS. 2a and 2b respectively.
Figure 3D:
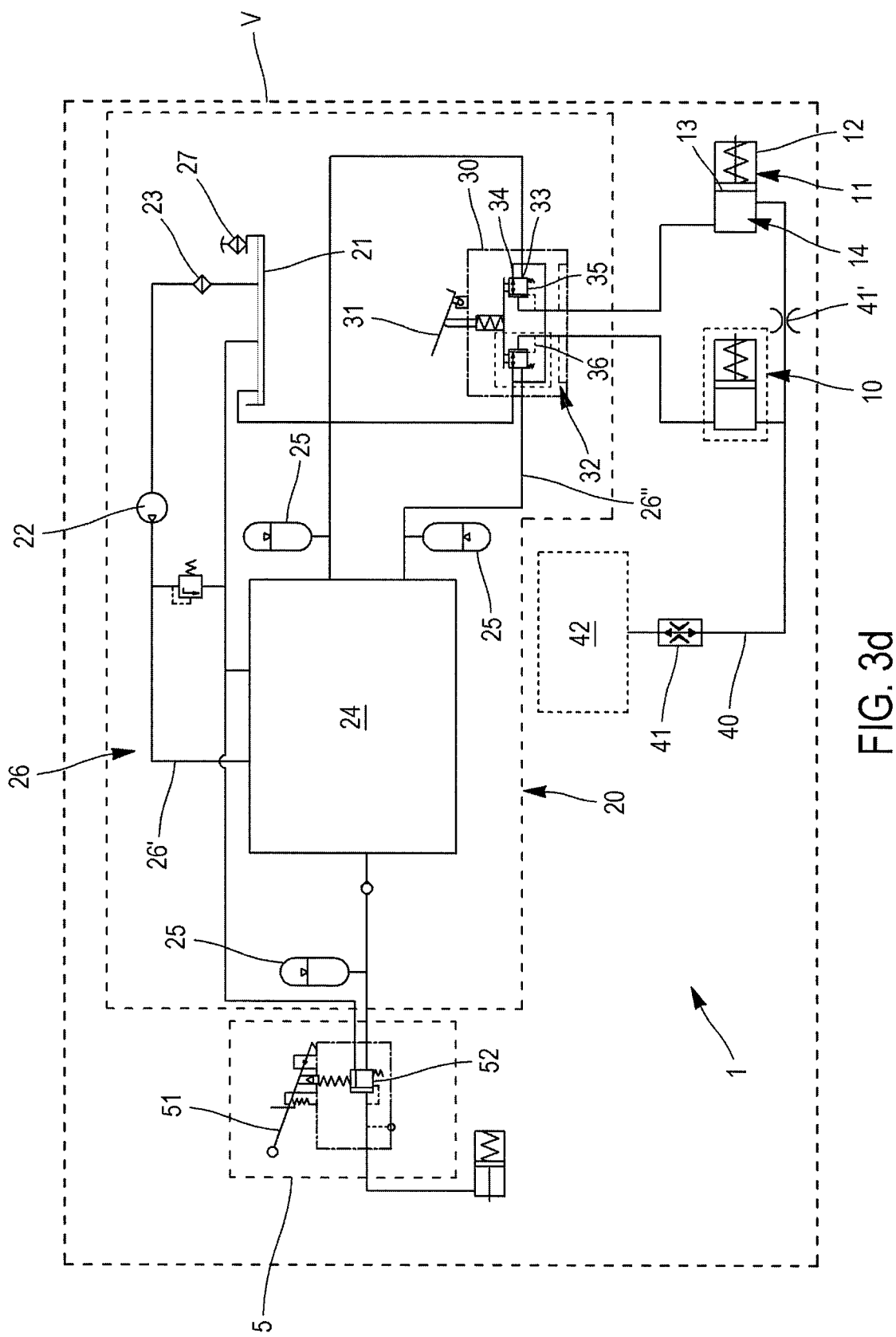

Alternatively, in FIGS. 3a and 3d, two valves 32 have been shown, controlled identically by the same mechanical control 31 to activate the brakes simultaneously.

Each pressure regulating valve 32 conforms to a valve shown schematically in section in FIG. 4a and includes:
  an inlet/outlet port 33 connected to the feed line 26 by a path P, the path P is therefore subjected to a flow rate at a certain pressure corresponding to the pressure delivered by the pump 22
  an inlet/outlet port 34 connected to the atmospheric pressure reservoir 21 by a path T, and
  an inlet/outlet port 35 connected to the chamber 14 of the ram of the brake 10 by a path F.

Each pressure regulating valve 32 includes a pressure measurement line 36 in the chamber 14 of the ream 11, making it possible for regulating the pressure in the path F according to the degree of actuation of the brake control. This line 36 is shown schematically to illustrate feedback of the pressure in the brake chamber on the operation of the valve 32, the feedback being described in more detail hereafter.

In the embodiment of FIGS. 3a to 3d the fact of having differentiated regulating valves 32 on the two brakes, each valve having a pressure measurement line for regulating the pressure in the chamber of the corresponding ram makes it possible, in response to a simultaneous brake command, to differentiate the degree of actuation of the brakes.

As is visible in FIG. 4a, each valve 32 includes a plunger or drawer 320 mounted in translation in a cylinder 321 so as to selectively put into communication the port 35 of the path F connected to the brake with the port 33 of the path P at the pump pressure or with the port 34 of the path T at atmospheric pressure according to a degree of actuation of the brake pedal 31.

In this regard, the valve 32 includes a charging spring 322 put into compression by actuation of the brake pedal 31 (or more generally the progressive mechanical control), tending to displace the plunger 320 to put into communication the path P with the path F.

The valve 32 also includes a feedback chamber 323 including a spring 324, the spring and the chamber being positioned on the side opposite the charging spring 322 with respect to the plunger, to exert a pressure opposing that of the charging spring.

Thus, in the absence of actuation of the pedal 31, the spring 324 exerts pressure on the plunger which puts into communication the path T with the path F and thus empties the brake chamber and releases the brakes.

During actuation of the pedal 31, the spring 322 increases its pressure on the plunger to put into communication the path P with the path F and thus tightens the brake and puts under pressure the brake chamber. In parallel, the pressure also increases in the feedback chamber 323 because it is connected to the brake chamber 14. The pressure in the feedback chamber 323 is equal to the pressure in the brake chamber 14, leaving out possible pressure losses.

Pressure in the feedback chamber 323 exerts a pressure on the plunger 320 opposing the pressure of the charging spring 322 resulting from the actuation of the brake, and tending to reduce the flow rate flowing from the path P to the path F.

When there exists a balance between the pressure of the charging spring 322, on the one hand, and the pressure exerted by the pressure of the fluid in the feedback chamber 323 on the other hand, the plunger remains balanced and holds the pressure in the path F—and in the brake chamber—at a constant value.

The balance depends on the geometric characteristics of the valve (plunger, cylinder) and on the calibration of the charging spring 322. Thus, the valve 32 delivers a pressure into the brake chamber and into the path F which is proportional to a degree of actuation of the pedal, the proportionality coefficient depending on the characteristics of the valve and the calibration of the spring.

Shown in FIG. 4b is the relation between the pressure obtained in the brake chamber 14 and the degree of actuation of the pedal 31. The proportional increase in the pressure as a function of the pedal travel only begins when the travel exceeds a so-called "dead stroke" wherein the compression exerted by the pedal on the charging spring 322 is not sufficient to transmit a force to the plunger 321.

When the pressure in the feedback chamber 323 of the brake exceeds the prescribed pressure corresponding to the degree of actuation of the pedal, the additional pressure in the feedback chamber 323 pushes the plunger to put the path T back into communication with the path F and reduce the pressure in the brake.

The pressure in the line F is therefore regulated no matter what the flow level circulating through F, as long as the delivery capacity of the pump is not reached, that is as long as the pump can supply the flow rate consumed by the circuit connected to the line F.

Thus the pressure in path F and in the brake chamber 14 is controlled at all times according to the degree of actuation of the brake control. This control is understood when the lining of the brake is physically pressing or not pressing against its disk or its drum, when there is a pressure on the pedal or when it is released, whether the brake is in motion, that is dynamically moving, or static, that is without movement.

In this embodiment, it is the operation itself of the valve which makes it possible to obtain this pressure control shown schematically in the figures on line 36.

Alternatively, the operation of the valve could be replaced by electric feedback 36 controlling the valve according to a pressure value measured in the brake chamber by a dedicated sensor.

In any case and to summarize, when the brake control 31 is not actuated, the pressure regulating valve 32 is in a first position where the inlet/outlet port 35 connected to the chamber 14 is connected to the inlet/outlet port 34 connected to the reservoir 21, so as to allow the discharge of oil possibly contained in the chamber 14 toward the reservoir 21.

When the brake control 31 is actuated, the valve 32 switches into a second position where the inlet/outlet port 35 connected to the chamber is connected to the inlet/outlet port 33 corresponding to the feed line 26, so as to fill the chamber with oil.

If the oil pressure in the chamber exceeds the level corresponding to the degree of actuation of the brake control 31, the valve 32 returns to its first position to restore the oil pressure, and if applicable alternates between the two positions to stabilize the oil pressure in the chamber.

It is thus noted that during periods of repeated actuation of the brakes, the oil contained in the chamber can be renewed relatively infrequently and thus can heat rapidly.

To ensure cooling of the chamber 14 of the ram 11, the braking system further includes a chamber cooling line 40, this line being designed to constantly feed the chamber 14 with a cooling flow, whether the brakes are actuated or not.

This flow rate is a weak flow compared to the flow rate delivered by the pump 22. According to the preceding example, the flow rate delivered by the pump 22 can be of the order of 10 to 30 L/min. The cooling flow rate can be much lower, but it must be sufficient to allow the volume of oil in the chamber 14 of the ram 11 to be renewed in a few seconds.

For example, the cooling flow rate can be greater than or equal to twice the volume of the chamber per minute (which makes it possible to ensure a renewal of the oil in the chamber every 30 seconds), and preferably five times the volume of the chamber per minute (to renew the oil in the chamber every 12 seconds), or even more advantageously 10 times the volume of the chamber per minute (to renew the oil in the chamber every 6 seconds).

The oil is thus renewed in the chamber at a frequency corresponding to the frequency of refilling of the chamber by the renewal flow rate.

The cooling line 40 includes a restriction 41 which is dimensioned according to the (predetermined) flow rate which must pass through that restriction, and hence according to the volume of the chamber 14. This makes it possible to limit the flow rate taken (or if applicable injected, see hereafter regarding the embodiment of FIGS. 2b, 3b and 3d) from the line to which is connected the cooling line 40. The leakage flow rate of the brake chamber 14 being thus limited, particularly with respect to the flow rate that the pump can deliver, this restriction 41 allows a rise in pressure in the brake chamber 14.

There is a difference in pressure between the lines located on either side of the restriction. In order for the brake chamber 14 to be at the pressure regulated by the valve 32, this must always be between the valve 32 and the restriction 41.

Hereafter, the end of the line 40 at which it is connected to the line from which it takes (or if applicable injects) a flow of oil is called the taking end; this end being opposite to the end of the line 40 connected to the chamber(s) 14 of the brake(s). The taking end of the line 40 is connected to a line wherein the fluid is at a pressure greater than or equal to atmospheric pressure (reservoir pressure).

According to a first embodiment, shown in FIGS. 2a, 3a and 3c, the cooling line 40 is connected, at its taking end, to the upstream portion 26' of the feed line 26, for example at the delivery of the pump 22. In this embodiment, considering the great differences in pressure which can occur between the line 26 and the chamber, the restriction 41 is advantageously a pressure-compensated flow rate limiter, dimensioned to carry out cooling in optimal fashion whatever the pressure differences at its terminals.

The pressure entering the restriction 41 is therefore equal to the pressure in the upstream portion 26' of the line 26 at the pump delivery.

The pressure in this line varies depending on an operating phase of the module 24.

If this module 24 is in the accumulator 25 charging phase, then the pressure in the line is strictly greater than the activation pressure of the brakes, and near the pressure delivered by the pumps, which, in the preceding example, corresponds to a pressure on the order of 200 bars. The following operation results:

when the brake 10 is not actuated, the chamber 14 is connected to the reservoir 21, it is therefore at atmospheric pressure because the path T of valve 32 is connected to the path F. The difference in pressure at the terminals of the restriction causes the flow of a cooling flow from the upstream portion 26' of the feed line 26 toward the brake chamber 14, then its discharge toward the reservoir at atmospheric pressure 21 through the pressure regulating valve 32.

when the brake 10 is actuated, the valve 32 is in the position wherein the chamber is fed by connecting the path F to the path P. The pressure in the chamber and in the path F is less than or equal to the maximum operating pressure of the brakes, that is in the preceding example, less than or equal to about 100 bars. There therefore still remains a pressure difference at the terminals of the restriction 41, so that a cooling flow also feeds chamber 14. However, when the sum of the cooling flow rate and the braking feed rate brings about an increase in pressure in the chamber, and consequently in the feedback chamber 323 of valve 32, above the level corresponding to the degree of braking desired, the valve 32 switches by putting into communication the path F with the path T to discharge the overpressure toward the reservoir 21, then switches again toward the brake feeding position wherein the path F is in communication with the path P.

If the module 24 is in a vacuumization phase of the pump, the accumulators being full, the pressure in the line between 22 and 24 is weak (about 5 to 20 bars for example).

The following operation results:

When the brake 10 is not actuated, the chamber 14 is connected to the reservoir 21 through the valve 32 which is in a position wherein the path T communicates with the path F. The chamber 14 is thus at atmospheric pressure. The pressure difference at the terminals of the restriction cause the flow of a cooling stream from the feed line 26 of the module toward the brake chamber 14, then its discharge toward the reservoir at atmospheric pressure 21 through the pressure regulating valve 32 because the path F still communicates with the path T. There exists therefore a constant flow rate from the brake chamber 14 toward the reservoir via the valve 32.

When the brake 10 is actuated, the valve 32 is in a position wherein the chamber is fed (path P in communication with path F). If the pressure in the chamber 14 is greater than the pressure at the connection with the restriction 41, a flow then occurs from the downstream portion 26" of the brake feed line, into the chamber 14 and toward the upstream portion 26' of the line 26 at the pump delivery toward the restriction 41. Consequently, to compensate for this circulation that could cause a loss of pressure in the chamber 14 and the path F, the valve 32 feeds the chamber 14 with a constant flow to re-balance pressure. If on the contrary the pressure in chamber 14 is less than the pressure in the upstream portion 26' of the module feed line 26, the flow takes place from this line 26' to the chamber 14, as when the brake is not actuated—an increase in pressure follows in the feedback chamber 323 tending to press the plunger to put it into communication the path F with the path T and to discharge the overpressure toward the reservoir via the path T.

The operation of the pressure regulating valve thus makes it possible to ensure a constant flow of fluid in the brake chamber to maintain the pressure constantly at a required pressure corresponding to the degree of actuation given to the brake control.

This therefore allows, no matter the circumstances, renewing the oil contained in the chamber to reduce the temperature of the chamber and avoid having the oil overheat.

When the braking system 1 includes several independent brakes 10, as in FIGS. 3a and 3c, the cooling line 40 must include supplementary restrictions (as many restrictions in all as there are brakes) so as to maintain the independence of operation of the brakes.

In the case represented on the figures where the braking system has two brakes 10, the line 40 therefore had two restrictions 41, 41'.

According to a first embodiment shown in FIG. 3a, each brake can be associated with a restriction, the two restrictions 41, 41' then being positioned in parallel, each restriction 41 positioned between a brake and the withdrawal end of the line connecting to the upstream portion 26' of the feed line. In practice, it is then advantageous to position these restrictions as close as possible to the brakes, or to position them within the body of the brakes, because in case of the cooling line 40 being cut, braking is preserved for a longer time.

According to an alternative embodiment shown in FIG. 3c, a first restriction is located between said end connecting to the upstream portion 26' of the feed line, and the set of two brakes, and the second restriction 41' is located between the two chamber 14 of the rams to have them communicate with one another. In practice this can be accomplished by using a first restriction 41 of the flow rate limiter type, and a second simple restriction 41' between the chambers of the rams.

According to an alternative embodiment shown in FIGS. 2b, 3b and 3d, the cooling line 40 is not connected to the feed circuit 10, but to a secondary hydraulic circuit 42 of the vehicle (at its withdrawal end).

Numerous embodiments can then be considered. By way of a non-limiting example, the secondary circuit can be the boosting circuit of the transmission circuit of the vehicle. In this case, the boosting circuit shares the reservoir 21 of the feed circuit, and oil circulates therein at a pressure less than or equal to the pressure in the feed circuit, for example at a pressure on the order of 20 to 30 bars.

The result is the following operation:
  when the brake 10 is not actuated, the chamber 14 is connected to the reservoir 21 by the valve 32 through the path F in communication with the path T, it is therefore at atmospheric pressure. The difference in pressure at the terminals of the restriction causes flow of a cooling stream from the secondary circuit toward the brake chamber 14, then its discharge to the reservoir at atmospheric pressure 21 through the pressure regulating valve 32 because the path F is still in communication with the path T.
  when the brake 10 is actuated, the valve 32 is in the position wherein the chamber is fed. The pressure there is less than or equal to the maximum operating pressure of the brakes, that is, in the preceding example, less than or equal to about 100 bars. If the pressure in the secondary circuit is less, which is the case if the circuit is a boosting circuit, then a stream flows from the chamber 14 to the secondary circuit 42 through the restriction 41, then afterward to the reservoir of said circuit (not shown but which in principle is common with the reservoir 21 of the feed circuit 20). Consequently, to compensate this circulation, the valve 32 feeds the chamber 14 with a constant stream to re-balance pressure. If, on the contrary, the pressure in the secondary circuit is greater than the pressure in the chamber, then the operation is the same as in the first embodiment: a stream flows from the secondary circuit toward the chamber 14 and in the path F, causing an increase in pressure in this path and in the feedback chamber 323 which puts the path F into communication with the path T to discharge a flow toward the reservoir and re-balance pressure.

Thus, in this other embodiment a constant flow is also ensured (with the exception of the case where the pressure in the brake chamber is strictly identical with the pressure of the secondary circuit, a situation that is possible but is considered as transient and which does not force reconsideration of the thermal equilibrium of the chamber), which renews the oil in the chamber and prevents it from heating, while also cooling the chamber itself.

As before, in the case wherein the braking system includes several independent brakes 10 (FIGS. 3b and 3d), the cooling line 40 must include as many restrictions as there are brakes 10, and in particular, in the examples of FIGS. 3b and 3d, include two restrictions 41, 41' if the braking system 1 includes two brakes 10.

According to a first embodiment shown in FIG. 3b, the restrictions 41, 41' can be associated with each brake and be mounted in parallel between the withdrawal end of the line, which connects it to the secondary circuit 42, and the chamber of a corresponding brake 10.

Alternatively, as in FIG. 3d, a first restriction 41 (for example a flow rate limiter) can be positioned between the end of the line 40 connecting to the secondary hydraulic circuit 42 and the set of brakes 10, and another restriction 41' can be placed between the chambers 14 of the rams to have them communicate with one another.

In yet another embodiment illustrated in FIG. 4a, the line 40 can connect the brake chamber 14 to the reservoir 21 at atmospheric pressure.

In this case, the circulation of oil in the brake chamber only takes place when the brake is actuated. Indeed, when the brake is not actuated, the valve 32 connects the path F to the path T connected to the reservoir 21, so that the hydraulic pressure is the same on either side of the brake chamber 14, and there is not circulation of fluid.

On the other hand, when the brake is actuated, the valve 32 is in the position wherein the path P is connected to the path F and the chamber is fed. The pressure in the chamber therefore rises to activate the brake, and a flow circulates through the path 40 from the brake chamber 14 toward the reservoir 21.

To compensate this flow and maintain pressure at a constant value in the chamber 14, the valve allows a constant flow from the path P to the path F.

This embodiment is sufficient to cool the brakes, because their heating occurs when they are actuated.

The invention claimed is:

1. A braking system including:
   a dynamic brake, including a hydraulic ram, containing a cylinder, a piston movable within the cylinder, and a chamber capable of being filled to displace the piston within the cylinder and actuate the brake,
   a brake feed circuit, including a reservoir, a pump and a line for feeding the brake,
   a brake control device, including a fluid pressure regulating valve of the pressure within the brake chamber, and a progressive control, said device being designed to deliver a predetermined pressure into the chamber depending on the degree of actuation of the control,
   wherein the fluid pressure regulating valve includes an inlet/outlet port connected to the feed line, an inlet/outlet port connected to the reservoir and an inlet/outlet port connected to the brake chamber, the fluid pressure regulating valve being designed to selectively connect the inlet/outlet port connected to the chamber to one or the other of the other ports depending on the pressure in the chamber and on the degree of actuation of the control, and wherein the braking system further includes a cooling line of the chamber, designed to renew the fluid contained in the chamber to provide cooling for said chamber.

2. The braking system according to claim 1, wherein the pressure regulating valve is designed to deliver to the brake chamber a fluid pressure proportional to a degree of actuation of the control.

3. The braking system according to claim 1, wherein the regulating valve includes:
   a plunger movable in translation within a cylinder,
   a pressure transfer member designed to exert a pressure on the plunger tending to put the inlet/outlet port connected to the feed line into communication with the inlet/outlet port connected to the brake chamber in response to the actuation of the control, and
   a feedback chamber connected to the brake chamber by an inlet/outlet port of the valve, the chamber being positioned on a side opposite to the transfer member with respect to the plunger so that a fluid pressure in the chamber exerts a pressure on the plunger tending to put the inlet/outlet port connected to the brake chamber into communication with the inlet/outlet port connected to the reservoir.

4. The braking system according to claim 3, wherein the fluid pressure regulating valve is designed to connect the inlet/outlet port connected to the chamber to the inlet/outlet port connected to the reservoir when the pressure in the chamber exceeds a pressure corresponding to a level of actuation of the control.

5. The braking system according to claim 1, wherein the brake cooling line includes a restriction designed to allow circulation of a cooling flow greater than or equal to twice the volume of the chamber per minute.

6. The braking system according to claim 5, including at least two dynamic brakes, and wherein the brake cooling line has as many restrictions as brakes.

7. The braking system according to claim 6, wherein the restrictions are positioned in parallel, between each chamber of a brake and a withdrawal end of the cooling line.

8. The braking system according to claim 6, wherein the cooling line includes a restriction positioned between one withdrawal end of the line and the brakes, and each other restriction connects the chambers of two brakes.

9. The braking system according to claim 1, wherein the cooling line connects the chamber of the brake to a line at a pressure greater than or equal to the reservoir pressure.

10. The braking system according to claim 9, wherein the brake cooling line is connected to the feed line, to withdraw from it or to inject into it the cooling flow of said line.

11. The braking system according to claim 9, the system being mounted in a vehicle further including a secondary hydraulic circuit, wherein the cooling line is connected to said circuit to withdraw from it or to inject it into the cooling flow.

12. The braking system according to claim 11, wherein the secondary circuit is a booster circuit of a transmission circuit.

13. A vehicle including a braking system according to claim 1.

14. A method for cooling a brake of a vehicle including a braking system including:
   a dynamic brake, including a hydraulic ram, containing a cylinder, a piston movable within the cylinder, and a chamber capable of being filled to displace the piston within the cylinder and actuate the brake,
   a brake feed circuit, including a reservoir, a pump and a line for feeding the brake,
   a brake control device, including a fluid pressure regulating valve of the pressure within the brake chamber, and a progressive control, said device being designed to deliver a predetermined pressure into the chamber depending on the degree of actuation of the control,
   wherein the fluid pressure regulating valve includes an inlet/outlet port connected to the feed line, an inlet/outlet port connected to the reservoir and an inlet/outlet port connected to the brake chamber, the fluid pressure regulating valve being designed to selectively connect the inlet/outlet port connected to the chamber to one or the other of the other ports depending on the pressure in the chamber and on the degree of actuation of the control, and wherein the braking system further includes a cooling line of the chamber, designed to renew the fluid contained in the chamber to provide cooling for said chamber,
   the method including, when the brake is not actuated, feeding the chamber of the brake through the cooling line at a pressure less than the brake actuating pressure, and the discharge of the chamber toward the reservoir by the pressure regulating valve of the control device.

15. The cooling method according to claim 14, in a vehicle equipped with a braking system wherein the brake cooling line is connected to the feed line, to withdraw from it or to inject into it the cooling flow of said line, the system further including at least one hydraulic accumulator and a module designed for charging the accumulator or to selectively achieve a vacuum of the pump when the accumulators are full, and the brake feed line comprising a portion upstream of the module and a portion downstream of the module, the method further including, when the brake is actuated:
   simultaneous feeding of the chamber by the feed line and the cooling line, and discharge of the chamber toward the reservoir by the pressure regulating valve, for regulating the pressure in the chamber when the module charges the accumulator or achieves a vacuum of the pump and the pressure in the chamber is less than the pressure in the upstream portion of the feed line, or
   feeding the chamber through the downstream portion of the feed line and discharging the chamber toward the upstream portion of the feed line through the restriction when the module achieves a vacuum of the pump and the pressure in the chamber is greater than the pressure in the upstream portion of the feed line.

16. The cooling method according to claim 14, in a vehicle including a secondary hydraulic circuit and equipped with a braking system wherein the cooling line is connected to said circuit to withdraw from it or to inject into it the cooling flow, further including, when the brake is actuated, feeding the chamber through the feed line and discharging of the chamber toward the secondary circuit through the cooling line if the braking pressure in the chamber is greater than the pressure of the secondary circuit, or feeding of the chamber by the secondary circuit and its discharge toward the reservoir through the pressure regulating valve if the pressure in the chamber is less than the pressure of the secondary circuit.

17. A braking system including:
  a dynamic brake, including a hydraulic ram, containing a cylinder, a piston movable within the cylinder, and a chamber capable of being filled to displace the piston within the cylinder and actuate the brake,
  a brake feed circuit, including a reservoir, a pump and a line for feeding the brake,
  a brake control device, including a fluid pressure regulating valve of the pressure within the brake chamber, and a progressive control, said device being designed to deliver a predetermined pressure into the chamber depending on the degree of actuation of the control,
wherein the fluid pressure regulating valve includes an inlet/outlet port connected to the feed line, an inlet/outlet port connected to the reservoir and an inlet/outlet port connected to the brake chamber, the fluid pressure regulating valve being designed to selectively connect the inlet/outlet port connected to the chamber to one or the other of the other ports depending on the pressure in the chamber and on the degree of actuation of the control, wherein the braking system further includes a cooling line of the chamber, designed to renew the fluid contained in the chamber to provide cooling for said chamber, and wherein the brake cooling line includes a restriction designed to allow circulation of a cooling flow greater than or equal to twice the volume of the chamber per minute.

18. The braking system according to claim 17, including at least two dynamic brakes, and wherein the brake cooling line has as many restrictions as brakes.

19. The braking system according to claim 18, wherein the restrictions are positioned in parallel, between each chamber of a brake and a withdrawal end of the cooling line.

20. The braking system according to claim 18, wherein the cooling line includes a restriction positioned between one withdrawal end of the line and the brakes, and each other restriction connects the chambers of two brakes.

21. A method for cooling a brake of a vehicle including a braking system including:
  a dynamic brake, including a hydraulic ram, containing a cylinder, a piston movable within the cylinder, and a chamber capable of being filled to displace the piston within the cylinder and actuate the brake,
  a brake feed circuit, including a reservoir, a pump and a line for feeding the brake,
  a brake control device, including a fluid pressure regulating valve of the pressure within the brake chamber, and a progressive control, said device being designed to deliver a predetermined pressure into the chamber depending on the degree of actuation of the control,
wherein the fluid pressure regulating valve includes an inlet/outlet port connected to the feed line, an inlet/outlet port connected to the reservoir and an inlet/outlet port connected to the brake chamber, the fluid pressure regulating valve being designed to selectively connect the inlet/outlet port connected to the chamber to one or the other of the other ports depending on the pressure in the chamber and on the degree of actuation of the control, and wherein the braking system further includes a cooling line of the chamber, designed to renew the fluid contained in the chamber to provide cooling for said chamber,
the method including, when the brake is not actuated, feeding the chamber of the brake through the cooling line at a pressure less than the brake actuating pressure, and the discharge of the chamber toward the reservoir by the pressure regulating valve of the control device,
the brake cooling line further being connected to the feed line, to withdraw from it or to inject into it the cooling flow of said line, the system further including at least one hydraulic accumulator and a module designed for charging the accumulator or to occasionally achieve a vacuum of the pump when the accumulators are full, and the brake feed line comprising a portion upstream of the module and a portion downstream of the module, the method further including, when the brake is actuated:
  simultaneous feeding of the chamber by the feed line and the cooling line, and discharge of the chamber toward the reservoir by the pressure regulating valve, for regulating the pressure in the chamber when the module charges the accumulator or achieves a vacuum of the pump and the pressure in the chamber is less than the pressure in the upstream portion of the feed line, or
  feeding the chamber through the downstream portion of the feed line and discharging the chamber toward the upstream portion of the feed line through the restriction when the module achieves a vacuum of the pump and the pressure in the chamber is greater than the pressure in the upstream portion of the feed line.

* * * * *